United States Patent [19]
Anderson

[11] Patent Number: 6,154,210
[45] Date of Patent: Nov. 28, 2000

[54] METHOD AND SYSTEM FOR IMPLEMENTING BUTTON INTERFACE COMPATIBILITY IN TOUCH-SCREEN EQUIPPED DIGITAL IMAGING DEVICE

[75] Inventor: Eric C. Anderson, San Jose, Calif.

[73] Assignee: FlashPoint Technology, Inc., San Jose, Calif.

[21] Appl. No.: 09/200,290

[22] Filed: Nov. 25, 1998

[51] Int. Cl.[7] .............................. G06F 9/00; G06F 3/02
[52] U.S. Cl. ........................ 345/354; 345/173; 348/333
[58] Field of Search ..................... 345/326, 328, 345/347, 348, 352, 354, 172, 173; 348/13, 158, 211, 552, 333, 335

[56] References Cited

U.S. PATENT DOCUMENTS

| | | | |
|---|---|---|---|
| 5,402,170 | 3/1995 | Parulski et al. | 348/211 |
| 5,479,206 | 12/1995 | Ueno et al. | 348/211 |
| 5,914,735 | 6/1999 | Ito et al. | 348/552 |
| 5,943,603 | 8/1999 | Parulski et al. | 348/552 |

*Primary Examiner*—Raymond J. Bayerl
*Assistant Examiner*—Cao H. Nguyen
*Attorney, Agent, or Firm*—Sawyer Law Group LLP

[57] ABSTRACT

A system for implementing button interface compatibility for button aware applications executing on a touch-screen equipped digital imaging device. A touch-screen is coupled to the digital imaging device and is adapted to accept input from a user. An embedded computer system is built into the digital imaging device for implementing functionality for the digital imaging device. The embedded computer system includes a processor coupled to a memory, wherein the memory stores computer readable code which, when executed by the processor, causes the computer system to implement a hardware abstraction layer, a touch-screen manager, a button interface manager, and an event manager. The hardware abstraction layer is coupled to the touch-screen and is adapted to abstract the functionality of the touch-screen. The button interface manager is coupled to the touch-screen and is adapted to interface with a button aware application. The event manager is coupled to accept input from the touch-screen manager and the button interface manager, wherein the event manager interfaces a touch-screen aware application with the touch-screen by communicating with the interface manager and interfaces a button aware application with the touch-screen by communicating with the button event manager, wherein the touch-screen manager emulates button events to the button event manager such that the button aware application transparently interface with the touch-screen to accept the inputs from the user.

23 Claims, 13 Drawing Sheets

METHOD AND SYSTEM FOR IMPLEMENTING BUTTON INTERFACE COMPATIBILITY IN TOUCH-SCREEN EQUIPPED DIGITAL IMAGING DEVICE

FIELD OF THE INVENTION

The field of the present invention pertains to digital image capture devices. More particularly, the present invention relates to a method and system for supporting digital imaging device applications that are designed to interface with a touch-screen and applications that are not designed to interface with a touch-screen.

BACKGROUND OF THE INVENTION

Modern digital imaging devices implement a large portion of their functionality through one or more embedded computer systems. For example, typical digital imaging devices such as digital cameras and the like typically include an imaging device which is controlled by an embedded computer system built into the camera. When an image is captured, the imaging device is exposed to light and generates raw image data representing the image. The raw image data is processed and compressed by the computer system into a file, and subsequently stored in either an internal memory or an external, detachable, memory.

Many types of digital imaging devices are also equipped with a liquid-crystal display (LCD) or other type of display screen. The incorporation of an LCD allows the digital imaging device to be easily controlled and manipulated, and also provides an intuitive and easily used method of displaying device status, operating mode, stored images, and the like to the user.

In the case of a digital camera type imaging device, for example, two of the most commonly implemented digital camera modes are play mode and record mode. Typically, in play mode, the digital camera's LCD is used as a playback screen for allowing the user to review previously captured images either individually or in arrays of four, nine, or sixteen images, while in record mode, the LCD is used as a viewfinder in which the user may view an object or scene before taking a picture.

In addition to an LCD, the user interfaces of most digital cameras also include a number of buttons or switches for configuring the operating modes of the camera, navigating between images in play mode, and the like. For example, most digital cameras include buttons (e.g., two buttons labeled "−" and "+") that enable a user to navigate or scroll through captured images. For example, if the user is reviewing images individually, meaning that single images are displayed full-sized in the LCD, pressing one of navigation buttons causes the currently displayed image to be replaced by the next image. The digital camera can also include several software programmable buttons (often referred to as softkeys). The software applications (executing on the embedded computer system) implement the functionality of the digital camera by interfacing with the user via the buttons, the LCD screen on the back of the camera, and the like.

Several more recent types digital electronic imaging devices include a built-in LCD touch-screen display for implementing all or part of their user interface. These devices typically employ graphically depicted buttons on the touch-screen itself to accept user input. The user presses the touch-screen depicted button to, for example, scroll through captured images, switch between operating modes, and the like. The software applications that implement the functionality of touch-screen equipped digital cameras interface with the LCD touch-screen display. In some cases, the software applications use the LCD touch screen display to implement the majority of their interaction with the user.

Such software applications are typically designed to interface with the hardware of the touch screen equipped digital camera via an operating system executing on the embedded computer system of the camera. The operating system typically provides support for these applications, providing the low level services and routines needed to operate the touch screen, interpret commands from the user, etc. The software applications are designed to interface with the support structure, services, routines, etc., of the operating system.

There is a problem, however, in that software applications developed for non-touch-screen equipped cameras are not compatible with touch-screen equipped cameras. Unfortunately, non-touch-screen equipped digital cameras make up a majority of the camera type existing in the market. The new touch-screen equipped digital cameras will not be able to use the large number of applications developed for the non-touch-screen equipped digital cameras. The operating platform provided by the touch-screen equipped digital camera is different than the operating platform provided by the non-touch-screen equipped digital camera. For example, applications for touch-screen equipped digital cameras utilize touch-screen specific application drivers, programming interfaces, and the like to implement their input output (IO) functionality. Similarly, applications for non-touch-screen digital cameras utilize their own respective set of drivers, programming interfaces, and the like. There is no standardized ability to support both "touch-screen aware" apps and "button aware" on the same digital camera (whether the camera is equipped with a touch-screen or not). Ideally, the software applications should be portable between the types of digital cameras, to make the process of developing applications for new features, improvements, bug fixes, and the like, more efficient.

This same problem exists with other types of digital imaging devices which rely upon an operating system to implement a platform for running various software applications. Digital imaging devices designed to run touch screen aware apps will be incompatible with button aware apps. There is no standardized ability to support both types of applications on the touch screen equipped digital imaging device.

Thus, what is required is a system that provides a common platform for touch-screen aware apps and button aware apps. The required system should transparently support both touch-screen aware apps and button aware apps using the same underlying hardware of a touch-screen equipped digital imaging device. In addition, the required system should support button aware apps and touch-screen aware apps without requiring any changes to their embodying software code. The present invention provides a novel solution to the above requirements.

SUMMARY OF THE INVENTION

The present invention provides a system that implements a common platform for touch-screen aware apps and button aware apps. The system of the present invention transparently supports touch-screen aware apps and button aware apps using the same underlying hardware of a touch-screen equipped digital imaging device. In addition, the system of the present invention supports button aware apps and touch-screen aware apps without requiring any changes to their embodying software code.

In one embodiment, the present invention is implemented as a software based architecture that provides button interface compatibility for button aware applications executing on a touch-screen equipped digital camera. A touch-screen is coupled to the digital camera and is adapted to accept tactile input from a user, wherein the user "touches" the touch-screen to enter a command or some other type of input. An embedded computer system is built into the digital camera for implementing functionality for the digital camera. The functionality of the digital camera is realized through the execution of one or more software applications by the embedded computer system. The software architecture of the present invention includes a hardware abstraction layer, a touch-screen manager, a button interface manager, and an IO event manager. The hardware abstraction layer is coupled to the touch-screen and is adapted to abstract the hardware interfaces of the touch-screen. The button interface manager is coupled to the touch-screen and is adapted to interface with a button aware application. The touch-screen manager is coupled to both the IO event manager and the button interface manager.

The touch-screen manager supports touch-screen aware applications by directly coupling touch-screen type inputs to the touch-screen aware application via the IO event manager. The touch-screen manager supports button interface type applications by translating inputs from the touch-screen into button event type signals and providing them to the button aware application via the button interface manger. The touch-screen manager thus emulates button events to the button event manager such that the button aware application transparently interfaces with the touch-screen to accept the inputs from the user. The button aware application runs as if it were executing on a button interface type digital camera. In this manner, the software architecture of present invention transparently supports touch-screen aware apps and button aware apps using the same underlying hardware of the touch-screen equipped digital camera, without requiring any changes to their embodying software code.

BRIEF DESCRIPTION OF THE DRAWINGS

The present invention is illustrated by way of example and not by way of limitation, in the figures of the accompanying drawings in which like reference numerals refer to similar elements and in which.

DETAILED DESCRIPTION OF THE INVENTION

The present invention relates to a method and system for implementing button interface compatibility in a touch-screen equipped digital camera. The following description is presented to enable one of ordinary skill in the art to make and use the invention and is provided in the context of a patent application and its requirements. Although the present invention, a method and system for implementing button interface compatibility in a touch screen equipped digital imaging device, is described in part within the context of a digital camera, various modifications to the preferred embodiment will be readily apparent to those skilled in the art and the generic principles herein may be applied to other embodiments. That is, any digital device which processes, displays and/or prints digital images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention is a method and system for implementing button interface compatibility in a touch-screen equipped digital camera. The system of the present invention implements a common platform for touch-screen aware apps and button aware apps. The system transparently supports touch-screen aware apps and button aware apps using the same underlying hardware of a touch-screen equipped digital camera. In addition, the system of the present invention supports button aware apps and touch-screen aware apps without requiring any changes to their embodying software code. In one embodiment, the present invention is implemented as a software architecture that provides button interface compatibility for button aware applications executing on a touch-screen equipped digital camera. The method and system of the present invention and its benefits are described below.

Figure 1A:
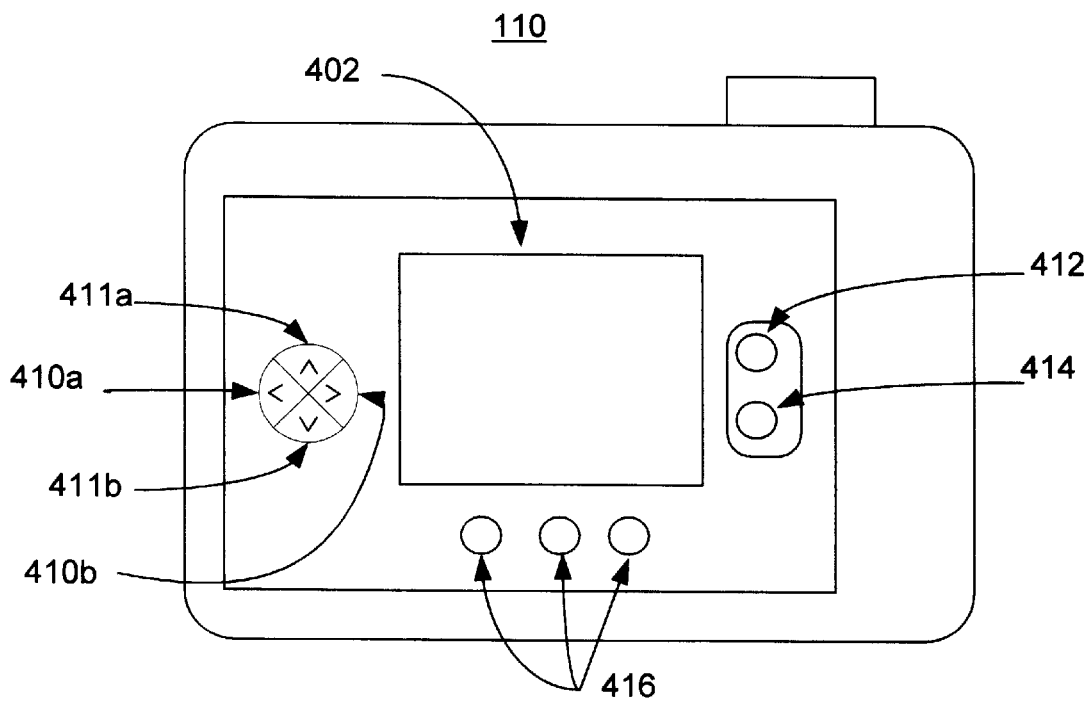
FIG. 1A shows a top view diagram depicting button interface hardware components of a button interface digital camera.
Figure 1B:
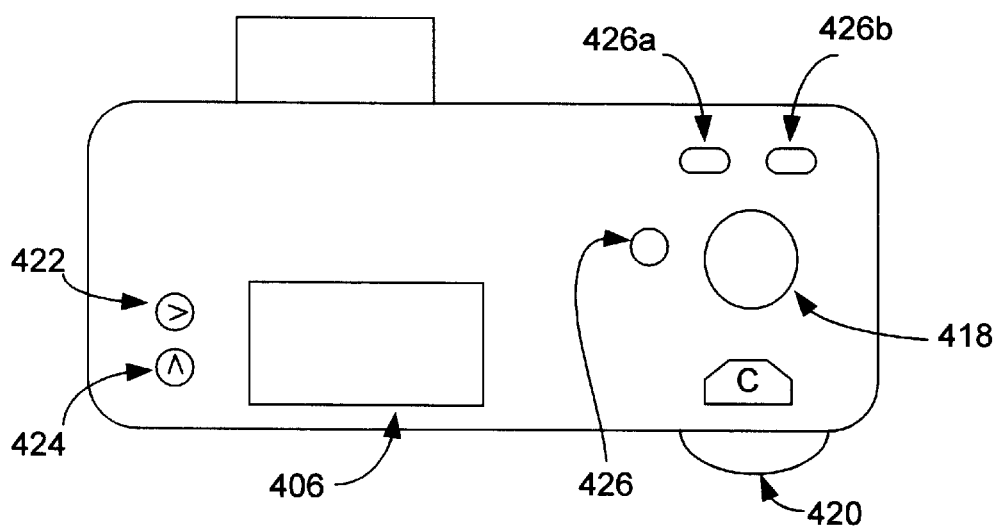
FIG. 1B shows a back view diagram depicting the button interface hardware components of the button interface digital camera.

FIGS. 1A and 1B are diagrams depicting the hardware components of a "button interface" camera 110 which is compatible with the software architecture of the present invention. FIG. 1A is back view of the camera 110 showing the LCD screen 402, a four-way navigation control button 409, an overlay button 412, a menu button 414, and a set of programmable soft keys 416. FIG. 1B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b. These buttons (e.g., four-way navigation control button 409, overlay button 412, menu button 414, and programmable soft keys 416), in conjunction with LCD screen 402, allow a user to interact and interface with camera 110.

Button interface camera 110 is provided with several different operating modes for supporting various camera functions. Such modes include, for example, capture mode or record mode for capturing images, and play mode for playing back the captured images on the LCD screen 402. For example, to take a picture, the user places camera 110 into capture mode by manipulating the appropriate components of camera 110's interface (e.g., turning mode dial to "c" for capture and pressing the shutter button 418). If the LCD screen 402 is activated, then the camera aids the user in preparing to capture an image by displaying a "live view" of the object viewed through the camera lens on the LCD screen 402 as a successive series of real-time frames. If the LCD screen 402 is not activated, then the user may capture an image using a conventional optical viewfinder (not shown).

Software applications implement the functionality of the digital camera by interfacing with the user via the button interface of camera 110 (e.g., LCD screen 402, four-way navigation control button 409, overlay button 412, menu button 414, and programmable soft keys 416). Applications use the button interface of camera 110 to accomplish their particular IO requirements with the user. This includes the user interacting with the functionality of camera 110 by, for example, changing modes, selecting images, entering data, or the like. Those applications specifically designed for the button interface of camera 110 are hereinafter referred to as "button aware" applications.

In accordance with the preferred embodiment, the software architecture of the present invention is fully compatible with the button aware applications of camera 110. Thus, button aware applications are able to execute and function nominally on digital cameras that do not incorporate the button interface the applications were specifically written for. The present invention provides a platform which enables a touch-screen equipped camera to run button aware applications even though the touch-screen equipped camera may have none of the hardware components (e.g., four-way navigation control button 409, overlay button 412, menu button 414, and programmable soft keys 416) such button aware applications require.

Figure 2A:
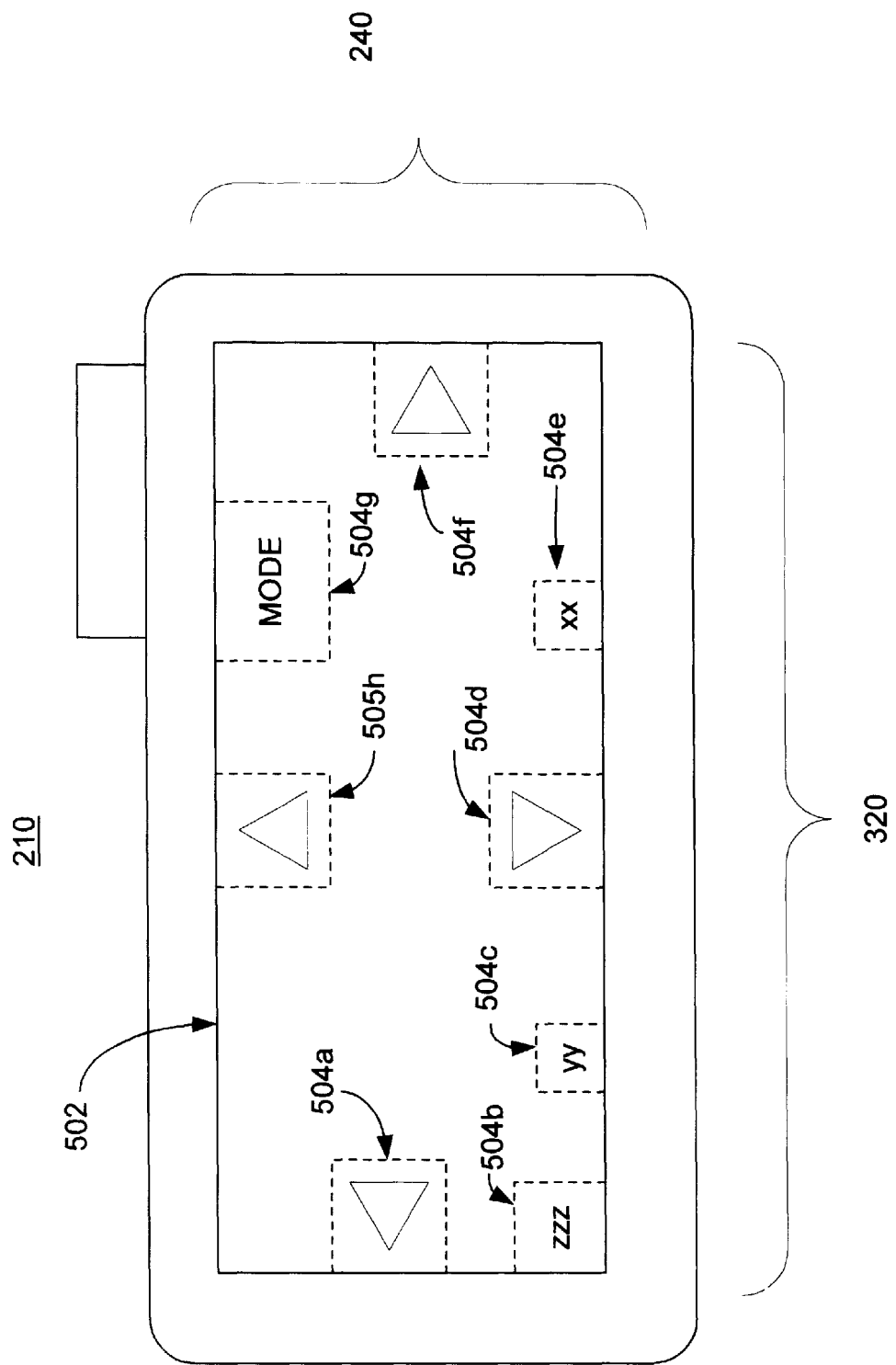
FIG. 2A shows a back view diagram depicting a touch-screen of a touch-screen equipped digital camera in accordance with one embodiment of the present invention.
Figure 2B:
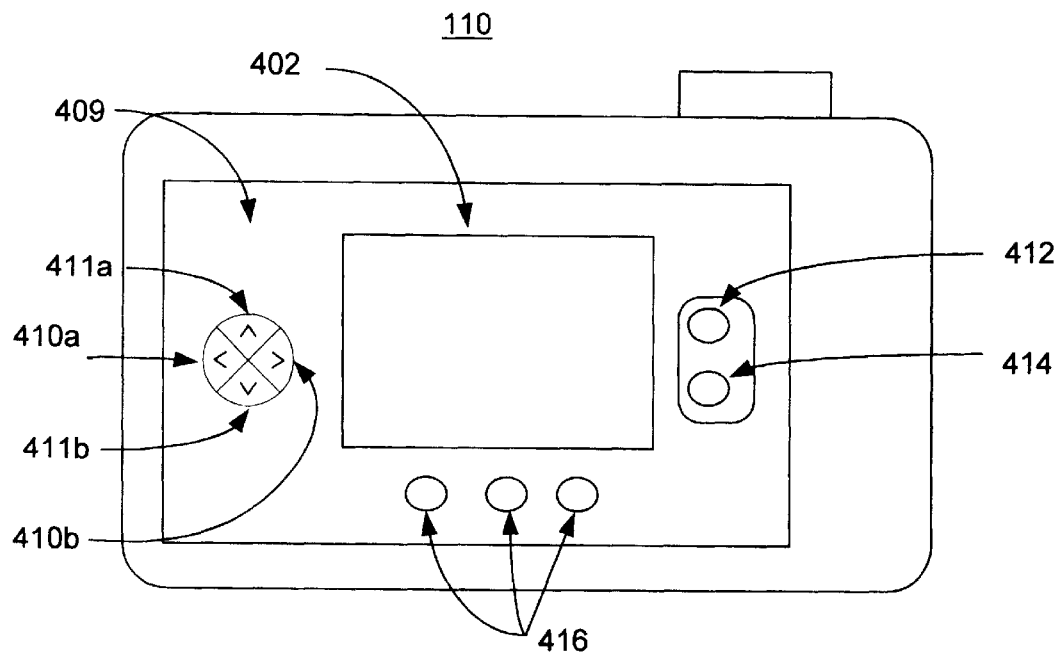
FIG. 2B shows a diagram of the correlation between the button interface of a button interface digital camera and the button input areas of a touch screen of a touch screen equipped digital camera.
Figure 2B:
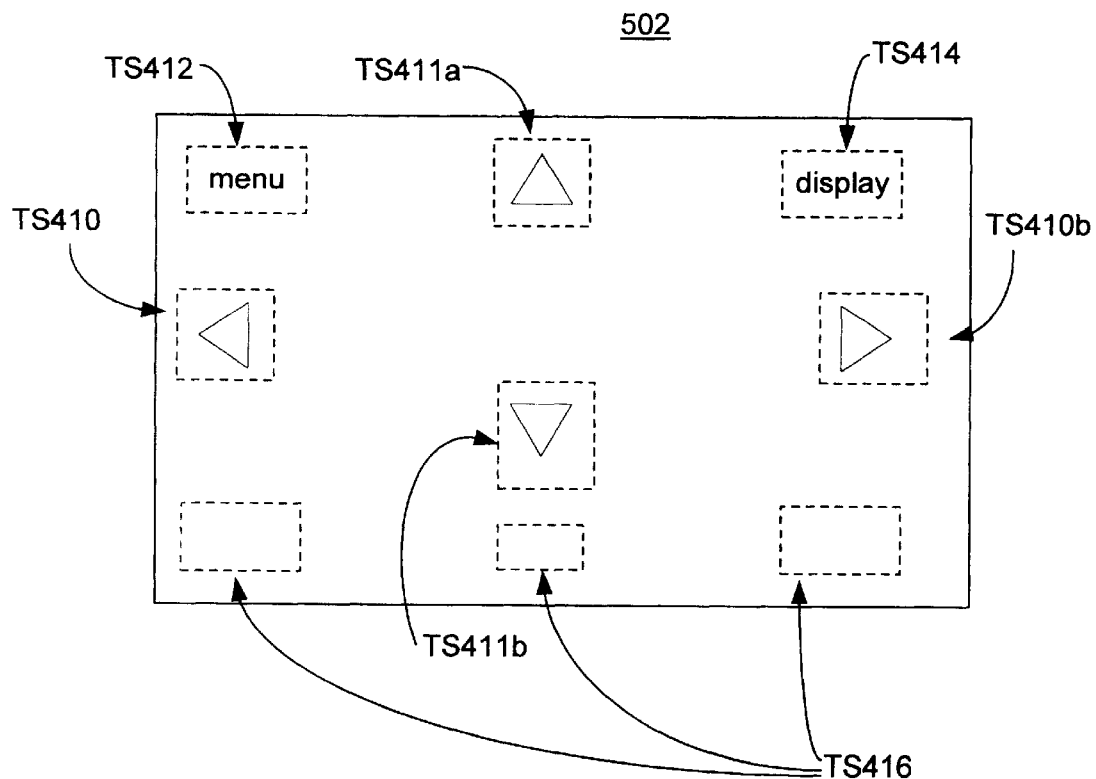

With reference now to FIG. 2, a back view of a touch-screen equipped digital camera 210 is shown. "Touch-screen" camera 210 differs from button interface camera 110 in that camera 210 includes a large touch-screen LCD 502 for accepting input from the user and presenting data to the user, as opposed to the button interface of button interface camera 110 (e.g., four-way navigation control button 409, overlay button 412, menu button 414, and programmable soft keys 416 of camera 110).

Touch-screen 502, as is well known, is operable to detect tactile input across its surface area. For example, touch-screen 502, determines the location of a touch (e.g., tactile input) from a user (e.g., via a stylus, etc.) with respect to a predetermined coordinate system (e.g., x y coordinates from a reference point on the surface of touch-screen 502). Under the correct circumstances, the touches are recognized as inputs by the applications designed to accept and function with them. These inputs are processed by the applications, thereby causing camera 210 to respond accordingly (e.g., by changing modes, accepting commands, sequencing through images, etc.).

These "touch-screen aware" applications are designed to utilize touch-screen 502 to interface with the user. The touch-screen aware applications typically present their own customized GUI (graphical user interface) on touch-screen 502 (e.g., graphic icons labeled with their particular respective function), and interact with the user via the GUI (e.g., the user touching one or another of the graphic icons to enter a command, change modes, etc.).

For example, as depicted in FIG. 2, touch-screen 502 includes input areas 504a–504h, which each function as specific input interfaces for the user. When the user touches a particular input area, the touch is regarded as an actuation of that particular input, and is acted upon by the touch-screen aware application accordingly. For example, instead of four way controller 409, touch-screen 502 is configured to recognize four input areas, input areas 504a, 504d, 504f, and 504h, to accept input from the user and thereby implement substantially the same functionality as four way controller 409 of button interface camera 110.

Thus, by arranging the input areas 504a–h along the periphery of touch screen 502, touch screen 502 is able to both graphically present information to the user (e.g., stored images, a live view display, etc.) in the manner dictated by the button aware application while also configuring input areas to accept input from the user. In this manner, the present embodiment solves the problem wherein the touch screen has to accept input from the user while also presenting the GUI rendered by the button aware application. The input areas 504a–h are able to accept input from the user without overly obscuring the GUI rendered by the button aware application.

As is well known, conventional implementations of touch screens in devices (e.g., an automated teller machine technology are not concerned with the obstruction of a background. The primary purpose of the touch screen in such a conventional device is to accept input from the user or to present text based information from the user. With the present invention however, touch screen 502 must both present the GUI of the button aware application (e.g., present a live view image) while also implementing input areas to accept user input. Additionally, the input areas must be implemented in a manner transparent to the button aware application. The button aware application must be provided with a platform capable of supplying its needed services, routines, interfaces, and the like required for the application to run. The implementation of input areas 504a–h and the support of button aware applications are further described below.

Referring still to FIG. 2, touch-screen camera 210 employs graphically depicted "buttons" on the touch-screen itself (e.g., input areas 504a–h) to accept user input. The user "presses" the touch-screen depicted button to, for example, scroll through captured images, switch between operating modes, and the like. The touch-screen aware applications that implement the functionality of touch-screen camera 210 execute on an embedded computer system built into camera 210. The software architecture of the present invention executes on top of the embedded computer system and is adapted to provide a standardized common platform for supporting both touch-screen aware applications and button aware applications, providing the needed services, routines, interfaces, and the like required by both types of applications.

The present invention provides a common platform for supporting both touch screen aware applications and button aware applications by abstracting the hardware components and functionality of the camera's IO subsystem. The software architecture of the present invention executes on the embedded computer system of camera 210, and interfaces with the embedded computer system of camera 210 in such a manner as to transparently support both button aware applications and touch-screen aware applications. To support button aware applications, components of the button interface are emulated on touch-screen 502 to allow the user to input "button events", as if actuating actual buttons of a button interface. To support touch-screen aware applications, the user's actuation of touch-screen depicted graphical icons are coupled to the touch-screen aware application as "touch-screen events".

To provide button events for a button aware application, the required button event type signals expected by the button aware application are generated by the software architecture to emulate the button interface required by the button aware application. The software architecture of the present invention configures camera 210 to configure certain areas of touch-screen 502 as "button event areas", and interpret tactile inputs to the certain areas (e.g., input areas 504a, 504d, 504f, and 504h) as button actuation areas, or button events, of an emulated button interface.

FIG. 2B shows a specific implementation of button event areas on touch screen 502 configured to explicitly correspond to the button interface of camera 110. As shown in FIG. 2B, the button event areas are labeled to show their correspondence with their respective counterpart of the button interface of camera 110. For example, the four way controller 409 can be actuated in four quadrants, 411a, 411b, 410a, and 410b, which correspond to four button event input areas ts411a, ts411b, ts410a, and ts410b. Similarly, softkeys 416 correspond to button event areas ts416, and buttons 412 and 414 correspond to button event areas ts412 and ts414.

As depicted in FIG. 2B, the locations of the button event areas on the touch-screen 502 in this implementation are specified by the software architecture of the present invention to intuitively correspond to the button interface of camera 110 for ease of use. The button aware application is not cognizant of these areas, and generates its particular GUI in accordance with its programming as if it is executing on a button interface camera (e.g., camera 110). The software architecture of the present invention translates actuations, or touches, to these areas into the button events expected by the button aware application. Hence, in this embodiment, the user is made aware of the button event areas by their descriptions, for example, in a user's manual supplied with camera 210. The manual would describe how, for example, touches to input areas ts410a, ts410b, ts411a, and ts411b will be interpreted as corresponding manipulations of a four-way controller (e.g., four-way controller 409).

Alternatively, the software architecture of the present invention can be configured to graphically render the button event areas in order to make them more intuitive to the user. For example, button event areas for emulating fourway controller 409 (e.g., input areas ts410a, ts410b, ts411a, and ts411b) can be rendered on top of the GUI generated by the button aware application such that they are transparent, thereby providing a more intuitive graphic cue as to their intended function. It should be noted, however, that as described above, the graphical representation or rendering of the button actuation locations is performed by the software architecture of the present invention as opposed to the button aware application. The embedded computer system which executes the software architecture of the present invention is described in the discussion of FIG. 3 below.

Figure 3:
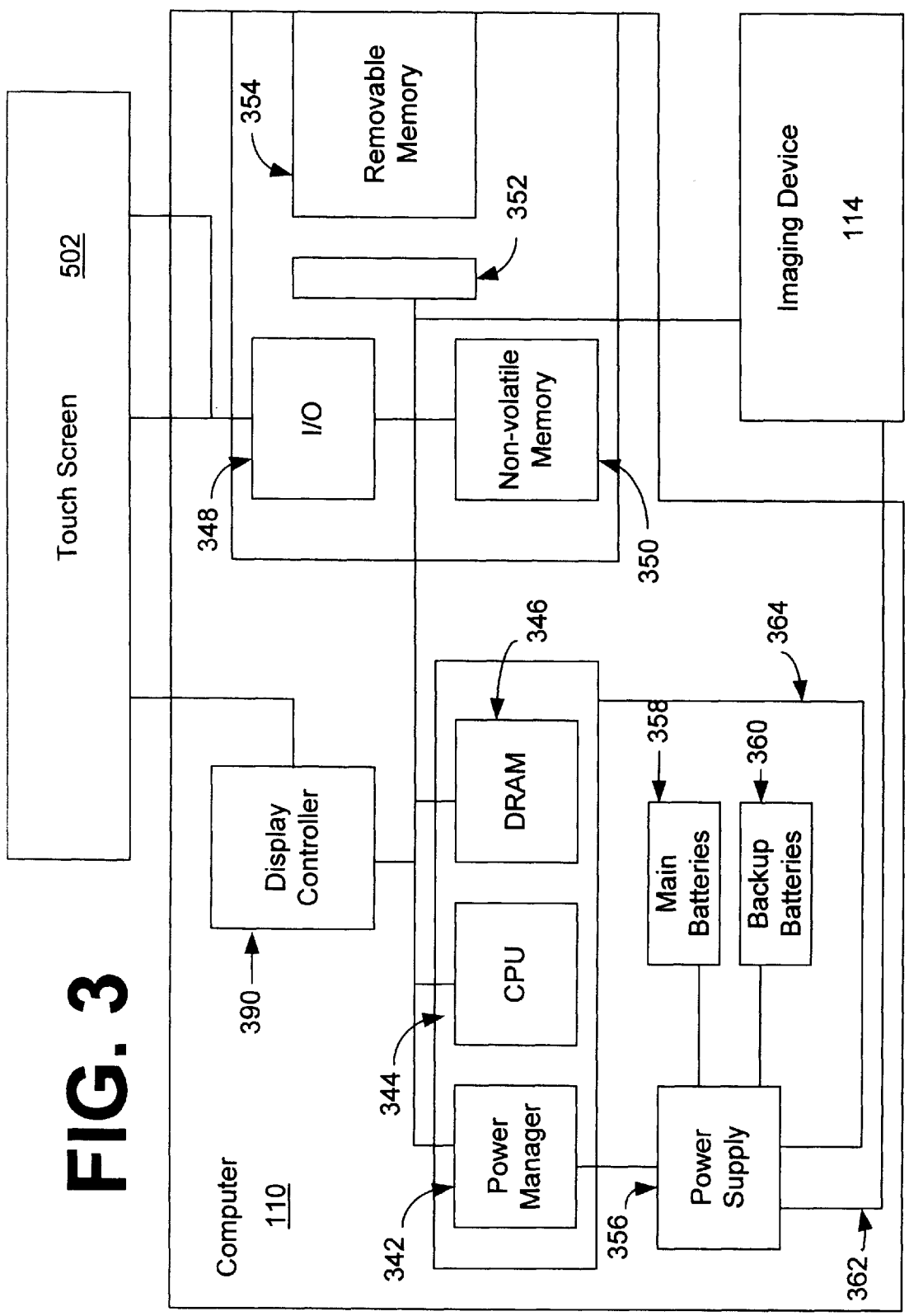
FIG. 3 shows a block diagram of an embedded computer system in accordance with one preferred embodiment of the present invention.

Referring now to FIG. 3, a block diagram of the embedded computer system built into touch-screen camera 210 is shown. Camera 210 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional processor device for controlling the operation of camera 210. In the preferred embodiment, CPU 344 is capable of concurrently running multiple software routines to control the various processes of camera 210 within a multithreaded environment. For example, images may be captured at the same time that previously captured images are processed in the background to effectively increase the capture rate of the camera. In a preferred embodiment, CPU 244 runs an operating system capable of providing a menu-driven GUI and software image processing. An example of such software is the Digita™ Operating Environment by FlashPoint Technology of San Jose, Calif.

I/O 348 is an interface device allowing communications to and from computer 118. For example, I/O 348 permits an external host computer (not shown) to connect to and communicate with computer 118. I/O 348 also interfaces with the touch-screen 502 of camera 210.

Non-volatile memory 350, which may typically comprise a conventional read-only memory or flash memory, stores a set of computer-readable program instructions to control the operation of camera 210. Removable memory 354 serves as an additional image data storage area and is preferably a non-volatile device, such a flash disk, readily removable and replaceable by a camera 210 user via buffers/connector 352.

Power supply 356 supplies operating power to the various components of camera 210. Power manager 342 communicates via line 366 with power supply 356 and coordinates power management operations for camera 210. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 210 user may also connect power supply 356 to an external power source. During normal operation of power supply 356, the main batteries 358 provide operating power to power supply 356 which then provides the operating power to camera 210 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 210.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers within DRAM 346. Once the raw image data is processed, it is stored in a frame buffer within DRAM 346 for display on the touch screen 502. Finally, display controller 390 accesses DRAM 346 and transfers processed image data to touch-screen 502 for display. Software code implementing the functionality of the present invention is instantiated and executed primarily from DRAM 346. This software code is described in greater detail below.

Figure 4:
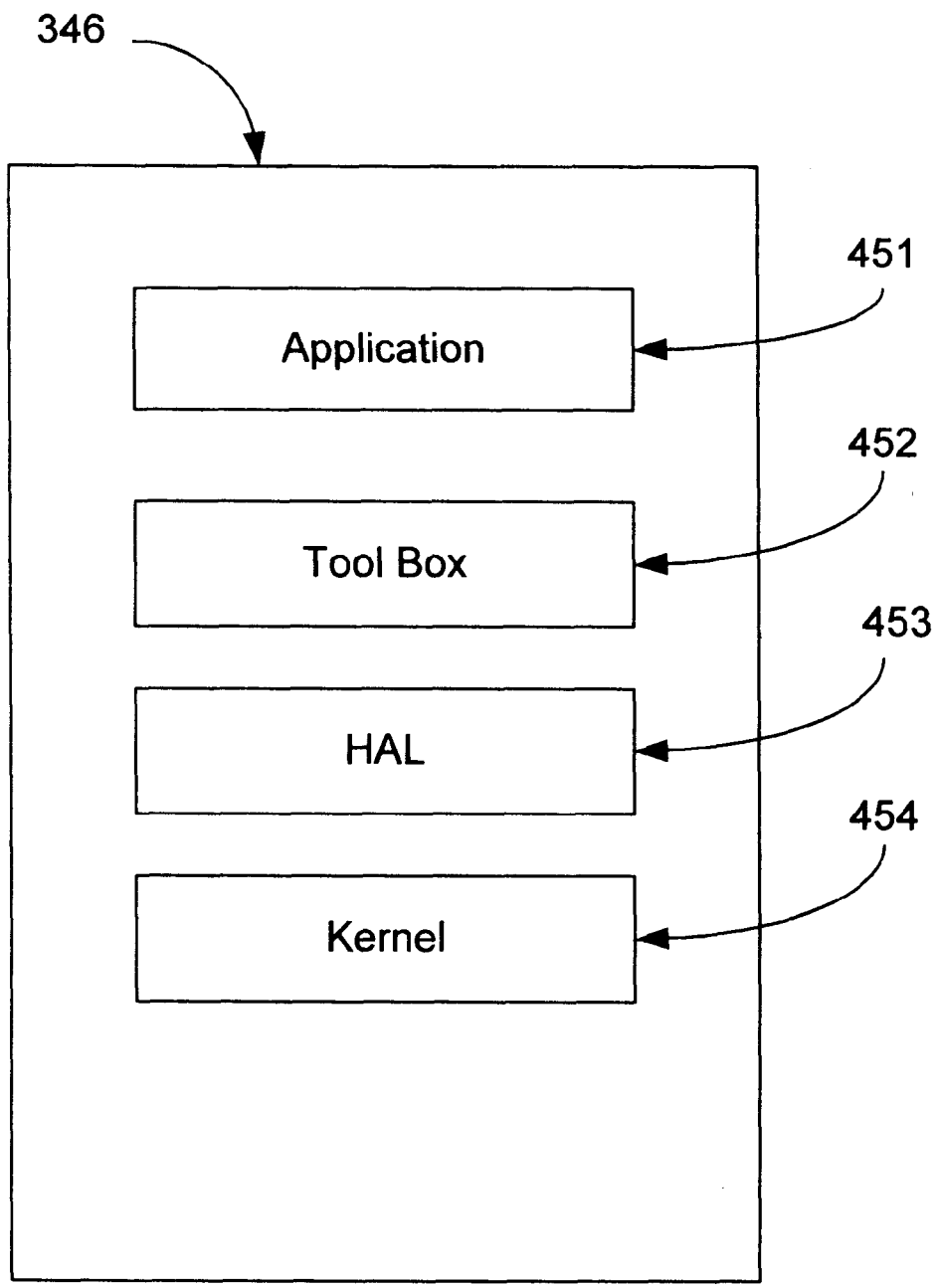
FIG. 4 shows a memory diagram of software within a DRAM of the digital camera in accordance with one embodiment of the present invention.

Referring now to FIG. 4, a memory diagram of software within DRAM 346 is shown. As depicted in FIG. 4, DRAM 346 includes software instantiations of an application 451, tool box 452, a HAL (hardware abstraction layer) 453, and an operating system kernel 454.

Application 451 includes the functions and routines which implement the GUI, features, functions, and the like of camera 210. Tool box 452 includes standardized, frequently called functions and subroutines which tend to be common across all applications. The functions of tool box 452 are frequently called by application 451 to implement certain functionality. HAL 453 includes software for abstracting the functionality of the underlying hardware of camera 210. HAL 453 abstracts the particular characteristics of the underlying hardware to provide a standardized interface to which other software can be written. Kernel 454 includes the functions and routines of the operating system which manages and allocates the resources of the embedded computer system of camera 210.

The software architecture of the present invention configures the operating system kernel 454 and tool box 452 of camera 210 such that if a touch-screen aware application runs, a touch-screen subsystem ensures that the touch-screen operates normally. But if a button aware application is run, the touch-screen subsystem defaults to a behavior wherein it generates standard button events, as expected by the button aware application. As described above, the button events correspond to inputs on various button event areas of touchscreen 502 (e.g., input areas ts410a, ts410b, ts411a, and ts411b), as if actuating actual buttons of a button interface. By including software objects (e.g., primarily within tool box 452) which support touch-screen aware and button aware applications, the present invention provides a common platform capable of running both types of applications, thereby providing a common platform for hardware manufacturers to design to and for application vendors to write for.

Figure 5:
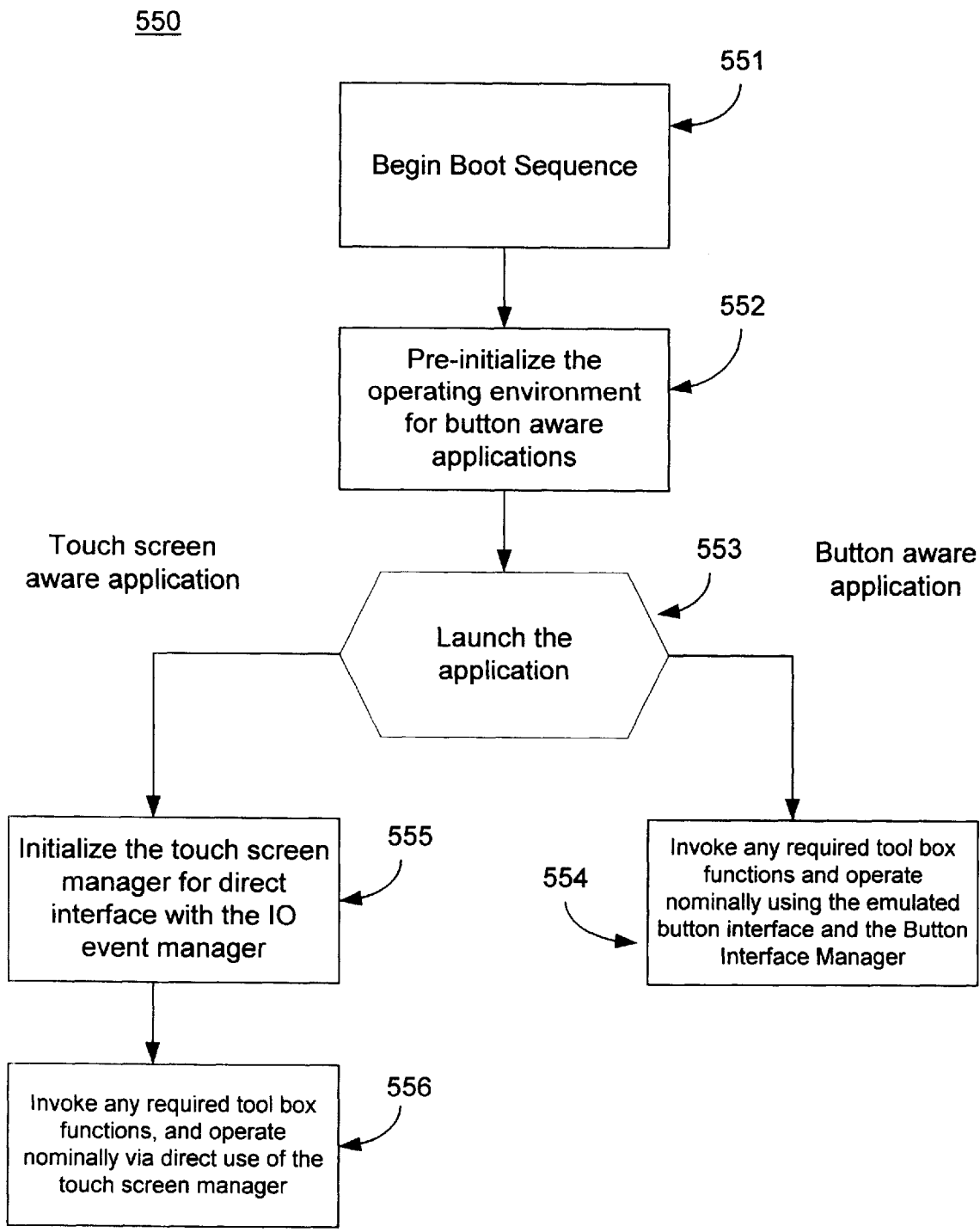
FIG. 5 shows a flow chart of the steps of an initialization process in accordance with one embodiment of the present invention.

FIG. 5 shows a flow chart of an initialization process 550 in accordance with one embodiment of the present invention. Process 550 shows the steps executed in initializing the operating environment of the software architecture of the present invention. In step 551, camera 210 begins its boot sequence after initial power up. Software functions are decompressed out of non-volatile memory 350 and instantiated in DRAM 346, certain software tables are initialized, etc. Alternatively, however, the software can execute directly from non-volatile memory 350. In step 552, the operating environment of camera 210 is pre-initialized. In accordance with the present invention, the operating environment is initialized to support button aware applications. The operating environment is initialized to instantiate those functions which provide the button interface emulation capabilities of the present invention. In step 553, the application is launched. This application can be a button aware application or a touch-screen aware application. If the application is a button aware application, in step 554, the necessary tool box functions are invoked and initialized, and the application functions according to its particular requirements, using the emulated button interface via a button interface manager. If the application is a touch-screen aware application, process 550 proceeds to step 555, where a touch-screen manager is initialized for direct interface with an IO event manager. Subsequently, in step 556, the touch-screen aware application invokes any required tool box functions and operates nominally via direct use of the touch-screen manager.

Figure 6A:
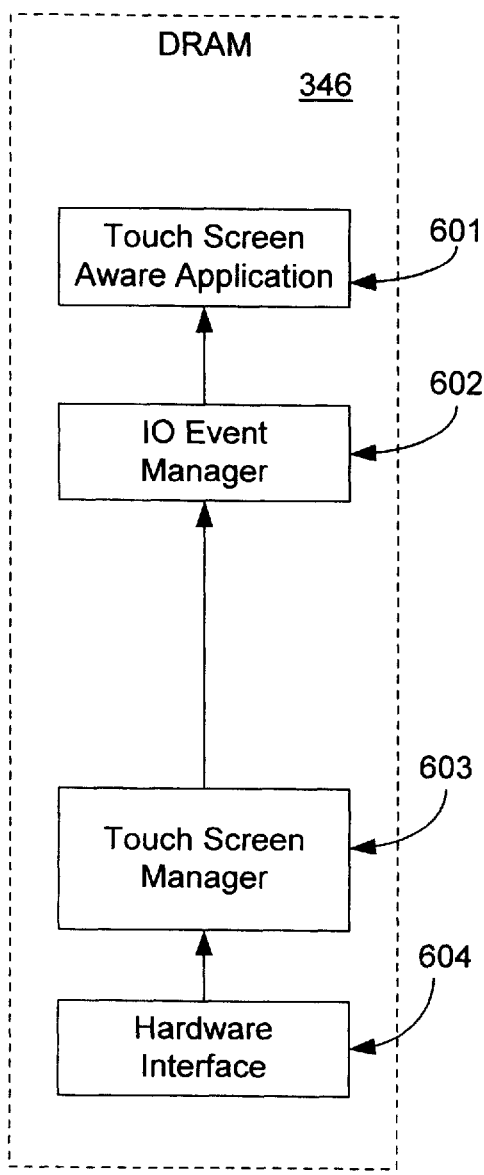
FIG. 6A shows a first memory diagram depicting the software objects/functions instantiated within a DRAM of the digital camera in accordance with one embodiment of the present invention.
Figure 6B:
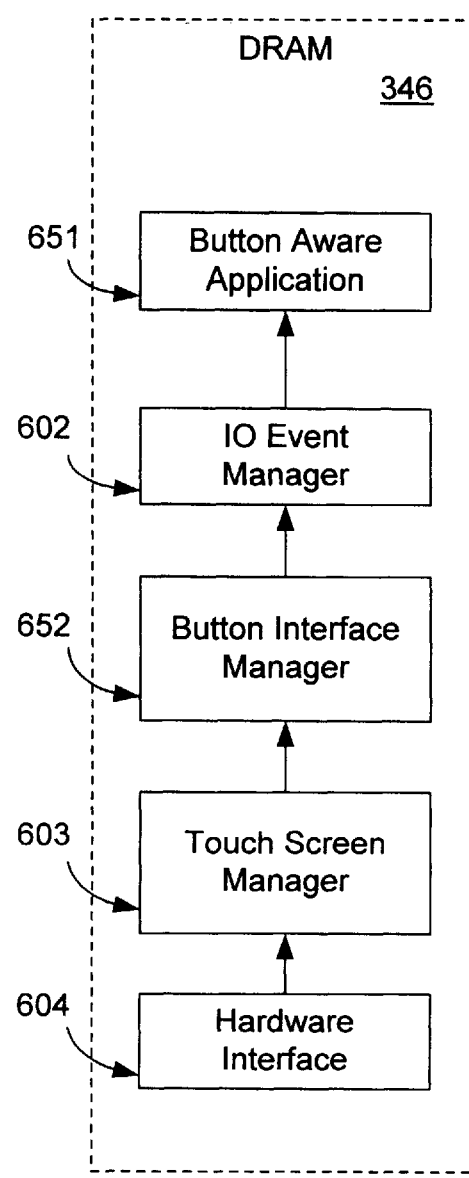
FIG. 6B shows a second memory diagram depicting the software objects/functions instantiated within a DRAM of the digital camera in accordance with one embodiment of the present invention.

Referring now to FIG. 6A and FIG. 6B, FIG. 6A and 6B respectively show a memory diagram 600 and a memory diagram 650 depicting signal paths between the software objects/functions that provide support for both button aware applications and touch screen aware applications. Diagram 600 depicts a memory diagram reflecting the relevant signal paths from the underlying hardware to the application where a touch-screen aware application is running on camera 210, as resulting from step 556 of FIG. 5. As shown in FIG. 6A, the touch-screen aware application 601 accepts inputs from a touch-screen manager 603 via an IO event manager 602. Touch-screen manager 603, in turn, receives inputs from a hardware interface 604, which is part of HAL 453 depicted in FIG. 4. In the present embodiment, IO event manager 602 and touch screen manager 603 are objects/functions from tool box 452 of FIG. 5.

Diagram 650 of FIG. 6B depicts a memory diagram showing the relevant signal paths in the case where a button aware application is running on camera 210, as resulting from step 554 of FIG. 5. As shown in FIG. 6B, the button aware application accepts inputs from a button interface manager 652 via IO event manager 602. Button interface manager accepts inputs from touch-screen manager 603. In the present embodiment, touch-screen manager 603 provides button event type signals to button interface manager 652 to thereby emulate a button interface. Button interface manager consequently provides button event signals to the button aware application (via IO event manager 602) in the manner expected by button aware application 346. As with IO event manager 602 and touch-screen manager 603, in the present embodiment, button interface manager 652 is an object/function from tool box 452.

As described above in the discussion of process 550 of FIG. 5, camera 210 pre-initializes to support button aware applications. Hence, after power up, diagram 650 shows the relevant signal paths from the underlying hardware to the application. If a touch screen aware application is run (e.g., touch-screen aware application 601), the touch-screen aware application initializes touch-screen manager 603 to provide touch-screen events directly to IO event manager 602 and touch-screen aware application 601. Thus, after the touchscreen application is started, diagram 600 shows the relevant signal paths from the underlying hardware to the application.

Figure 7:
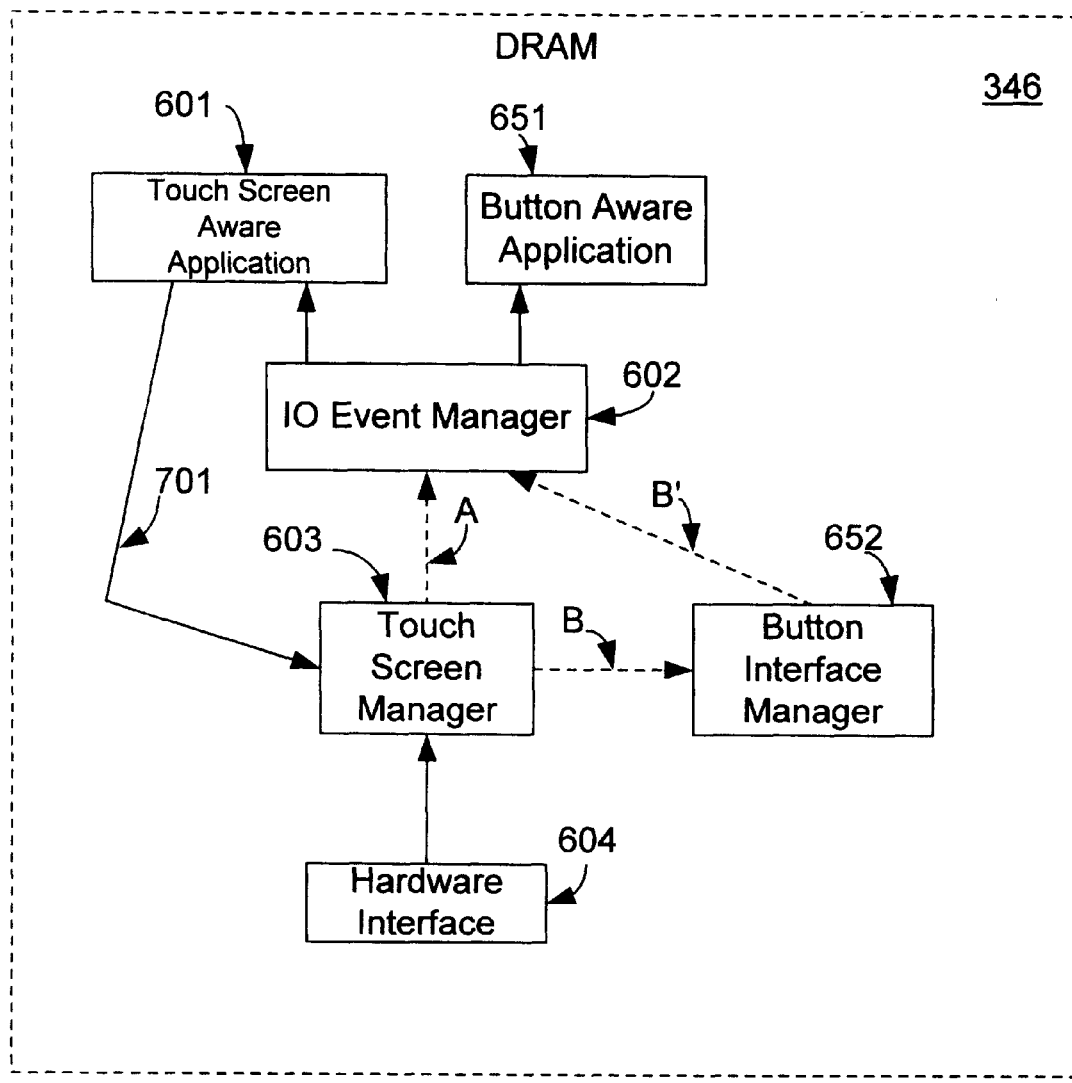
FIG. 7 shows a third memory diagram depicting the software objects/functions instantiated within a DRAM of the digital camera in accordance with an alternative embodiment of the present invention.

Referring now to FIG. 7, a memory diagram 700 is shown. Memory diagram 700 depicts the contents DRAM 346 in accordance with an alternative embodiment, wherein both the button aware applications and touch-screen aware applications can be simultaneously supported. In this alternative embodiment, button interface manager 652 remains instantiated, and IO event manager 602 passes either button events from button interface manager 652 or touch-screen events from touch-screen manager 603 to the button aware application or the touch-screen aware application, respectively.

As described above, touch screen manager 603 initializes to a default mode to support button aware applications. In the default mode, the signal path from the underlying hardware to the button aware application is depicted in FIG. 7 as path B and path B'. If a touch screen aware application is run, the touch screen aware application makes a call 701 to touch screen manager 603 to reconfigure the signal path for direct support of the touch screen aware application. This signal path is depicted as path A in FIG. 7.

In one alternate embodiment, touch screen manager 603 uses path A in both for both touch screen aware applications and button aware applications. The events passed to IO event manager 602 would emulate events from button interface manager 652 when in the "button aware mode" and would be touch screen events when in the "touch screen aware mode". In this embodiment, button interface manager 652 would either be non-resident or otherwise not provide any events to IO event manager 602.

Figure 8:
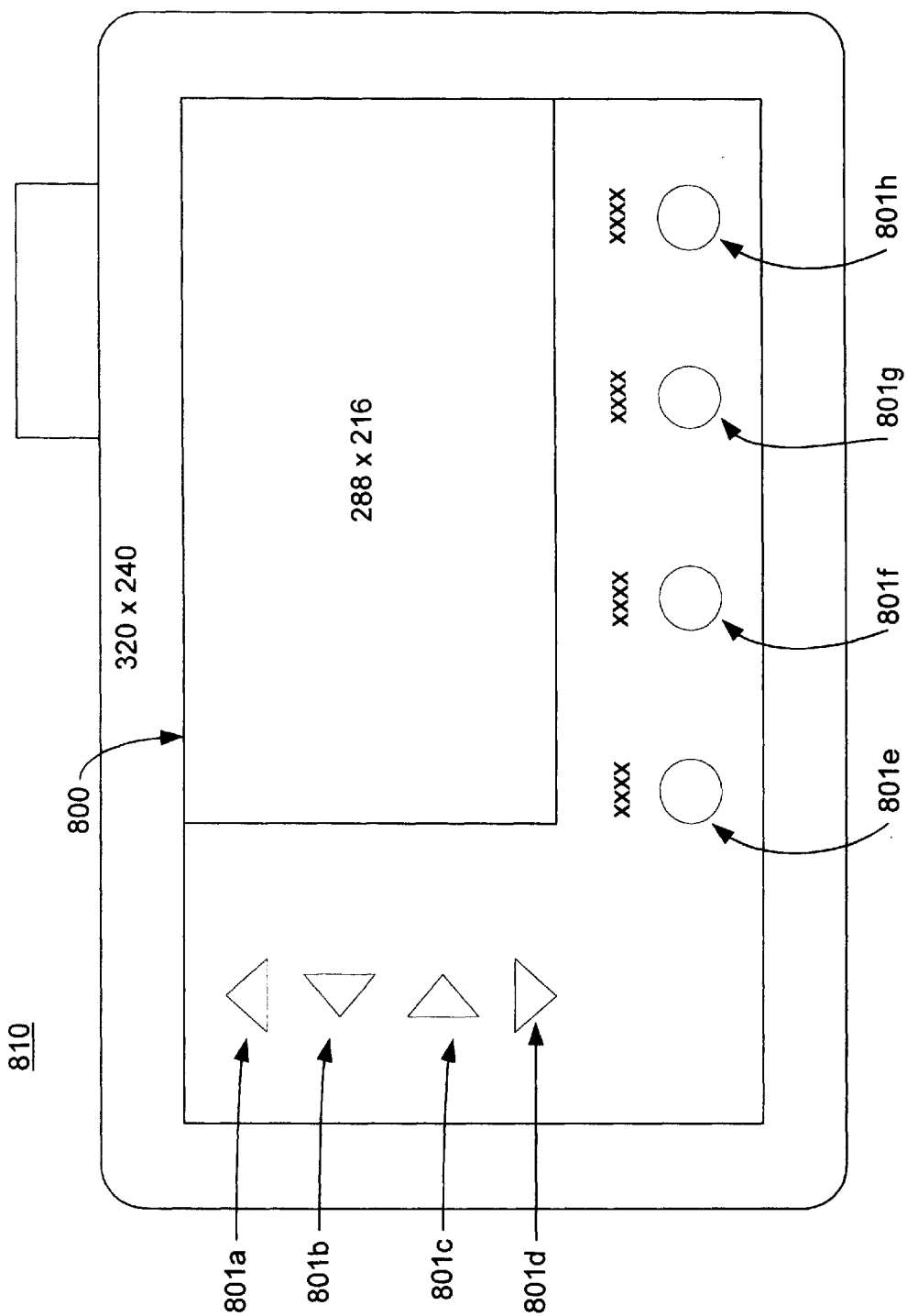
FIG. 8 shows a back view of a camera 810 showing a larger built in touch-screen in accordance with an alternative embodiment of the present invention.

With reference now to FIG. 8, a back view of a camera 810 in accordance with another alternate embodiment of the present invention is shown. FIG. 8 shows a back view of a camera 810, showing a built in touch-screen 800. Camera 810 is substantially similar to camera 210, however, camera 810 includes touch-screen 800 which is larger than touch-screen 502.

In this embodiment, the larger touch-screen 800 allows the depiction of a graphical button interface which provides a much more intuitive look and feel to the user than the transparent button event areas described above in the discussion of FIG. 2. For example, touch-screen 800 is 320×240 pixels while the LCD screen typical button aware applications utilize is only 288×216. Hence, touch-screen 800 depicts a 288×216 application graphics area for the button aware applications GUI display and utilizes its remaining area, a "border area", to graphically depict the typical elements of a button interface (e.g., elements 801*a*–801*h*). The button aware application only renders graphics for the 288×216 application graphics area while a display manager renders the graphics for the border area of the 320×240 touch-screen. In this embodiment, the display manager controls the responsiveness of the elements 801*a*–801*h* to provide feed back to the user (e.g., briefly flashing element 801*a* when it is pressed or generating an audio response such as a button click). As described above, touches to touch-screen 800 are translated by a touch-screen manager to button event type signals for a button interface manager.

Figure 9A:
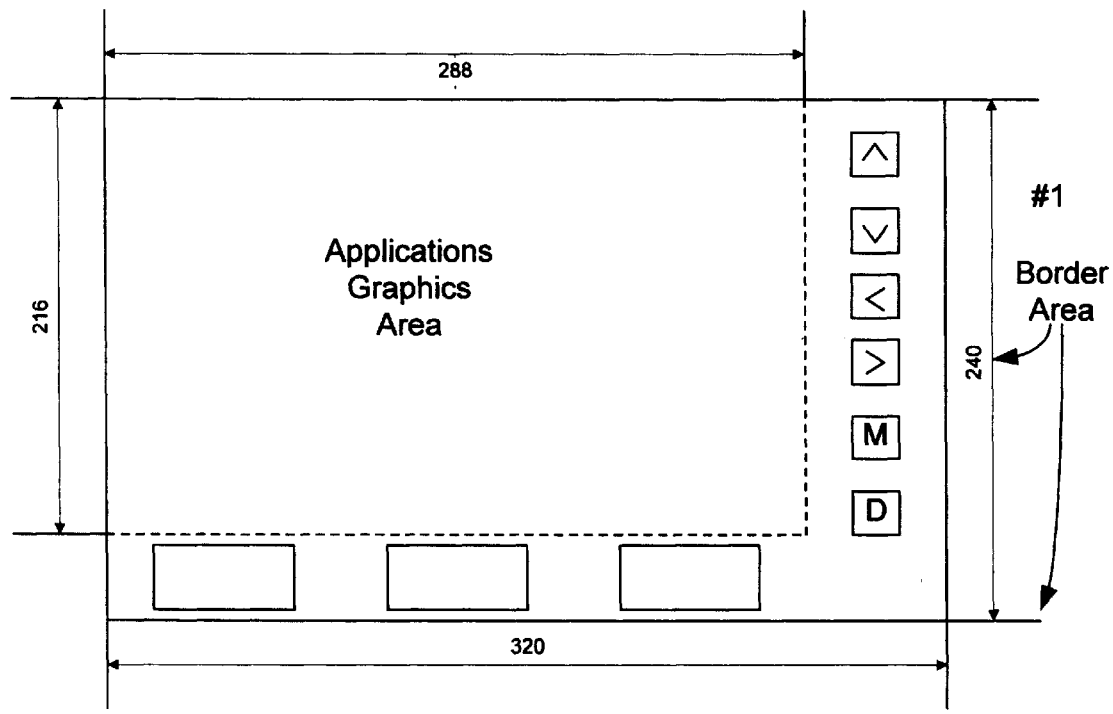
FIG. 9A shows a diagram of a first alternative implementation of a touch screen interface of the present invention.

FIGS. 9A, 9B, 9C, and 9D show four display examples implemented on touch screen 800. FIG. 9A shows an example implementation of touch screen 800 wherein all elements of a button interface are rendered graphically in the border area. One advantage of this implementation is that the user is never required to touch the active application graphics area. A disadvantage of this implementation is that the border area is relatively small, so much so that the user might easily touch two or more buttons inadvertently.

Figure 9B:
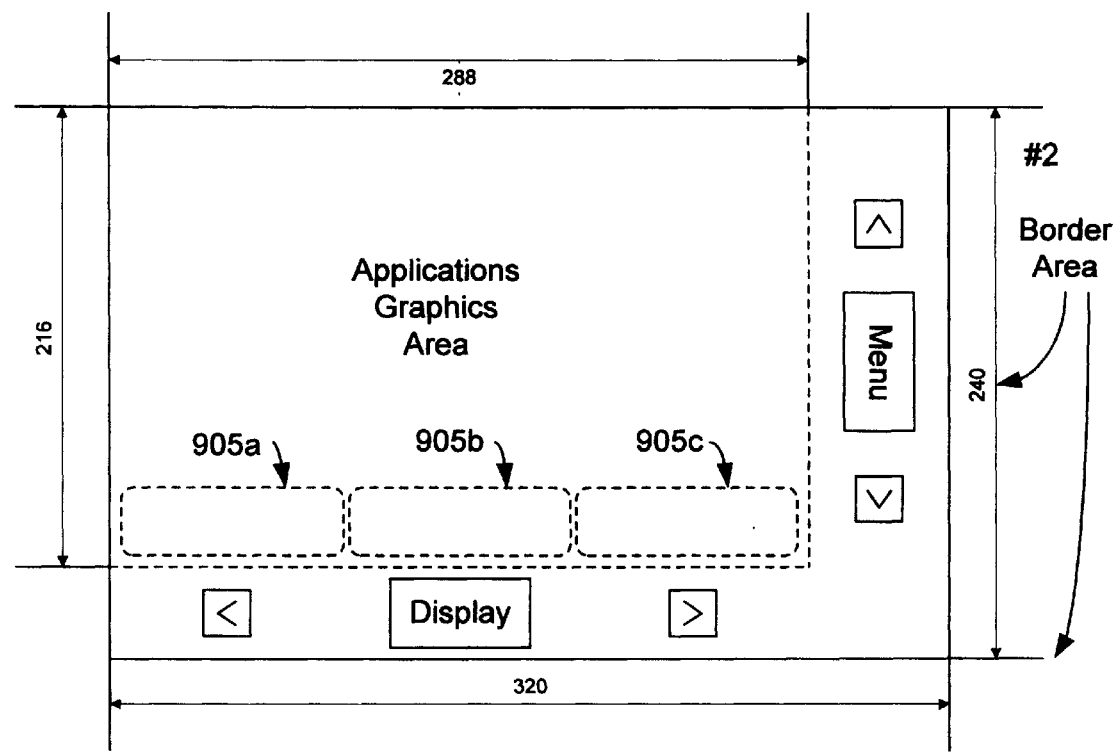
FIG. 9B shows a diagram of a second alternative implementation of a touch screen interface of the present invention.

FIG. 9B shows an example implementation of touch screen 800 wherein three softkeys input areas 905*a*–*c* are implemented within the application graphics area, while the remaining elements of a button interface are implemented in the border area. An advantage of this implementation is the less cluttered border area. A disadvantage is that the softkey input areas 905*a*–*c* are very close to each other and thus, the user might easily touch two inadvertently.

Figure 9C:
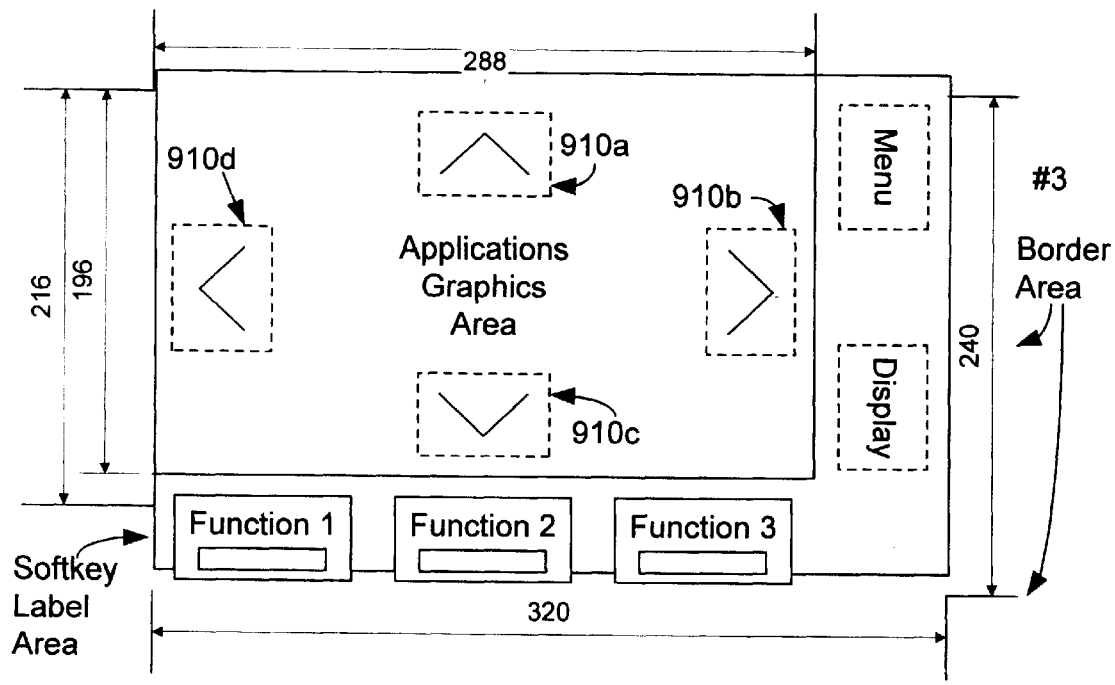
FIG. 9C shows a diagram of a third alternative implementation of a touch screen interface of the present invention.

FIG. 9C shows an example implementation of touch screen 800 wherein four way control button input areas 910*a*–*d* are implemented within the application graphics area, while the remaining elements of a button interface are implemented in the border area. The four way control button input areas 910*a*–*d* can be implemented such that they are completely transparent to the user, or alternatively, with light, semi-transparent overlays with dotted outlines around their sensitive areas. Additionally, function labels are also be rendered in the application graphics area. This frees more space in the border area such that the buttons can be rendered larger, reducing the chance of inadvertent actuation. While this may reduce the application graphics area somewhat (e.g., from 216 to 196 pixels in the vertical direction), the advantage of this implementation is the larger, easier to use buttons in the border area. A disadvantage of this implementation is the fact that the four way control button input areas 910*a*–*d* are either completely transparent, requiring some degree of fore knowledge on the part of the user, or semitransparent, obscuring the application graphics area.

Figure 9D:
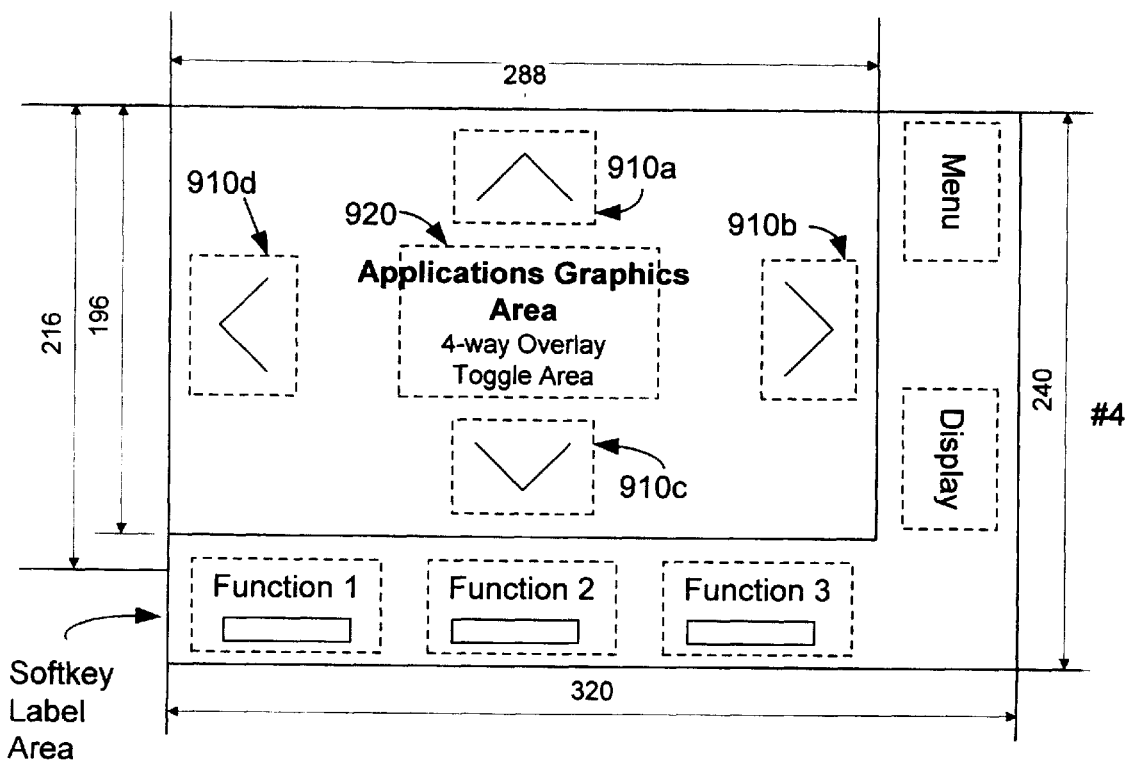
FIG. 9D shows a diagram of a fourth alternative implementation of a touch screen interface of the present invention.

FIG. 9D shows an example implementation of touch screen 800 wherein a four way overlay toggle area is implemented in the center of the application graphics area. This implementation is substantially the same as the implementation of FIG. 9C, however, the four way overlay toggle area 920 is operable to allow the user to toggle four way control button input areas 910*a*–*d* between a completely transparent state and a semi-transparent, opaque, or other such state. For example, when the user needs to manipulate one of the four way control button input areas 910*a*–*d*, the user merely touches the four way overlay toggle area 920 to make the input areas 910*a*–*d* visible. After manipulation, the user toggles the input areas back to their transparent state by touching the four way control button input areas 910*a*–*d* again. Alternatively, the four way control button input areas 910*a*–*d* can revert back to their transparent state after some preprogrammed amount of time (e.g., 3 seconds), without further action from the user. This implementation corrects the disadvantage of the implementation of FIG. 9C. The user is not required to have fore knowledge regarding the locations and use of completely transparent button input areas, and these areas, if rendered in an opaque or semi-transparent manner, do not permanently obscure the applications graphics area.

Figure 10:
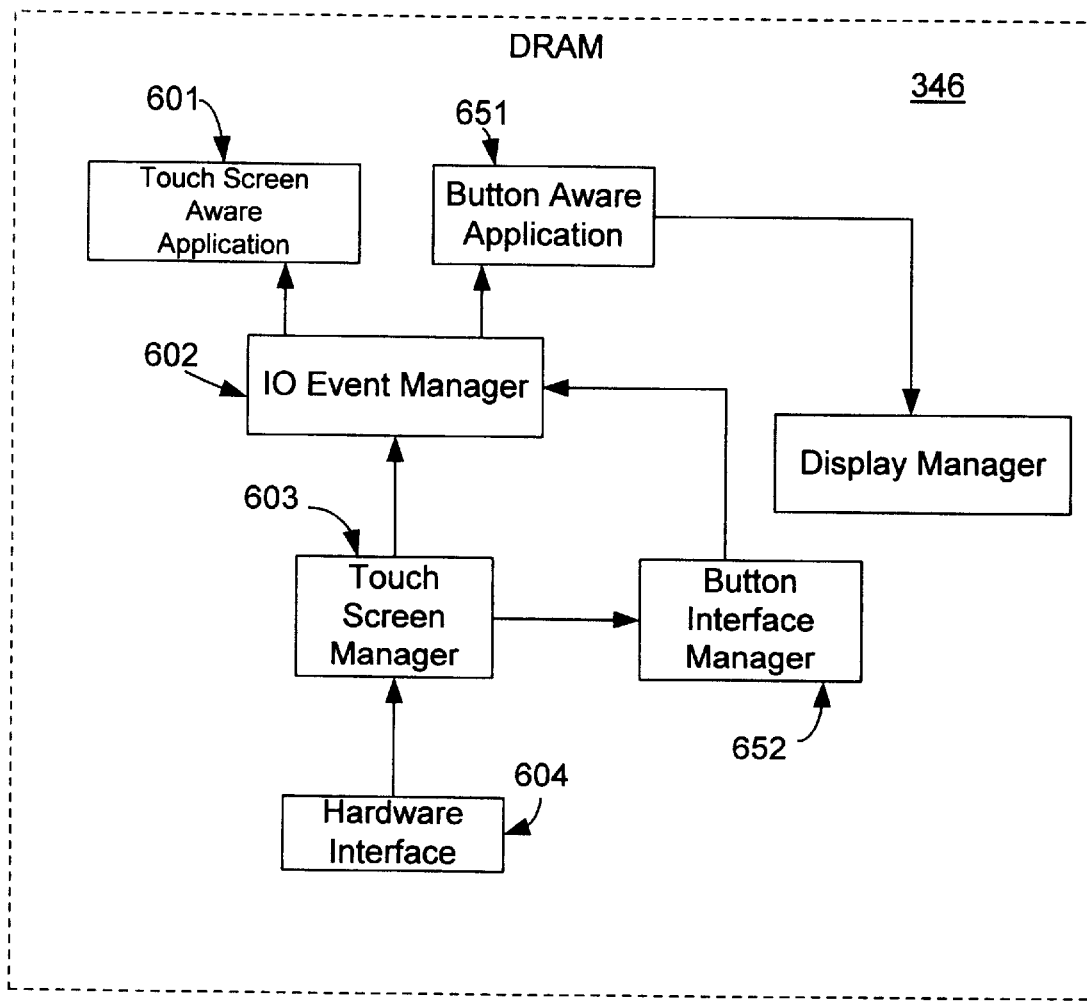
FIG. 10 shows a memory diagram depicting a display manager software object/function in accordance with the large touch-screen embodiment of the present invention.

FIG. 10 shows a memory diagram 950 showing a display manager 901 with respect to the other objects/functions of the software architecture of the present invention. In the present embodiment, display manager 901 receives input from the button aware application to implement feed back to the user. The touch screen aware application also uses the display manager 901.

Figure 11:
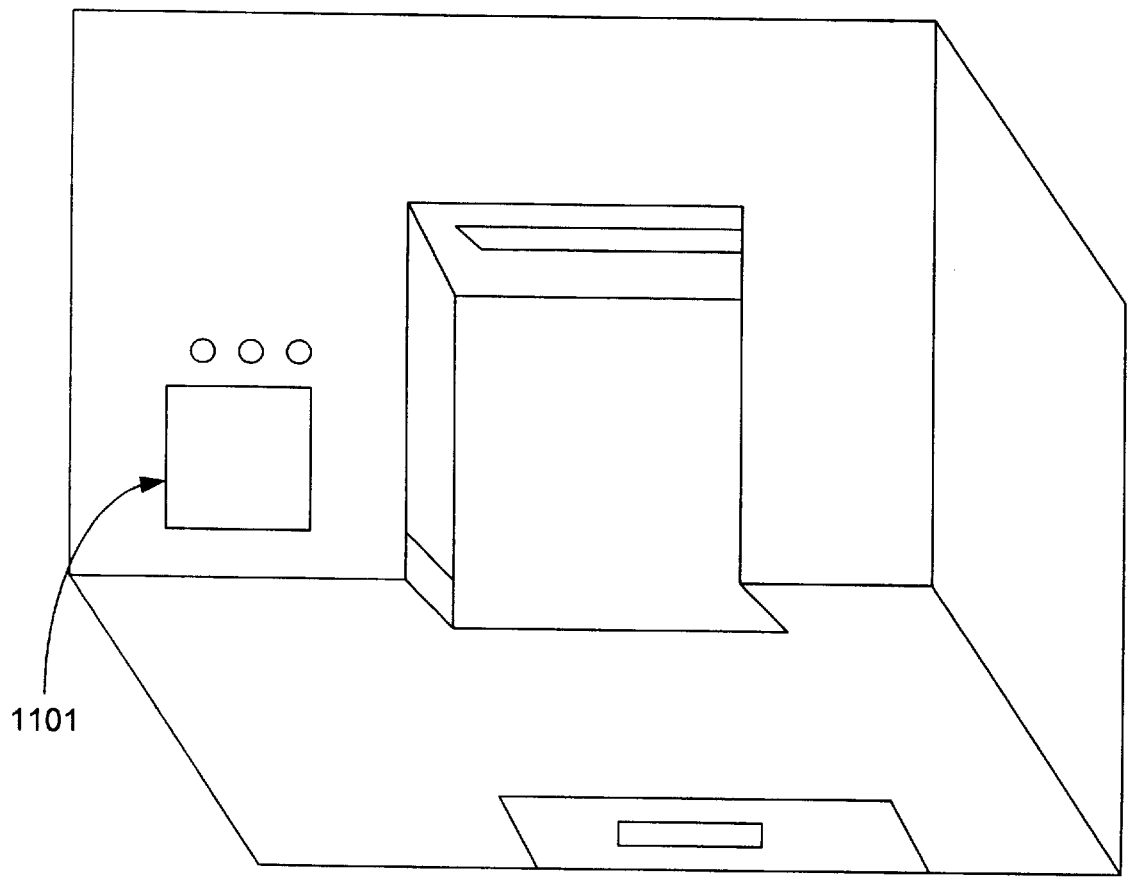
FIG. 11 shows a touch screen equipped printer-type digital imaging device in accordance with one embodiment of the present invention.

FIG. 11 shows a touch screen equipped printer device 1100 incorporating the software architecture of the present invention. As described above, the present invention is applicable to other types of digital imaging devices in addition to digital cameras. Printer 1100 of FIG. 11 is one example of another type a digital imaging device which functions with the present invention. Printer 1100 includes a printing engine for printing images onto paper. The images are typically provided digitally to the internal print engine by a coupled computer system, a coupled digital camera, a coupled removable storage device, or the like. Printer 1100 also includes a touch screen 1101 for providing interaction with a user. Printer 1100, in the same manner as digital camera 810, includes an embedded computer system for implementing its functionality (e.g., providing operating system based services). This computer system executes the software of the present invention, thereby providing a common platform for both button aware applications and touch screen aware applications for the printer. Hence, printer 1100 functions in much the same manner with regard to supporting both button aware apps and touch screen aware apps as camera 810 of FIG. 8, except that instead of digitally capturing images as with camera 810, printer 1100 prints previously captured images. Accordingly, it should be appreciated that the method and system of the present invention can be implemented with many different types of digital imaging devices.

Thus, the present invention provides a method and system for implementing button interface compatibility in a touch-screen equipped digital imaging device. The system of the present invention implements a common platform for touch-screen aware apps and button aware apps. The system transparently supports touch-screen aware apps and button aware apps using the same underlying hardware of a touch-screen equipped digital imaging device. In addition, the system of the present invention supports button aware apps and touch-screen aware apps without requiring any changes to their embodying software code.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A digital imaging device, comprising;

a touch-screen for accepting input from a user; and an embedded computer system built into the digital imaging device for implementing functionality for the digital imaging device, the computer system having a processor coupled to a coupled to a memory, the computer capable of executing software applications including a button aware application and a touch-screen aware application the memory storing computer readable code which when executed by the processor causes the computer system to implement;

a hardware abstraction layer coupled to the touch-screen, the hardware abstraction layer for abstracting the functionality of the touch-screen;

a touch-screen manager coupled to the touch-screen via the hardware abstraction layer;

a button interface manager for interfacing with the button aware application, the button interface manager coupled to the touch-screen manager; and an IO event manager coupled to accept input from the touch-screen manager and the button interface manager, wherein if the touch-screen aware application is executed by the computer, the IO event manager interfaces the touch-screen aware application with the touch-screen by communicating with the touch screen manager, and if the button aware application is executed by the computer, the IO event manager interfaces the button aware application with the touch-screen by communicating with the button interface manager, wherein the touch-screen manager emulates button events to the button interface manager such that the button aware application transparently interfaces with the touch-screen to accept input from the user.

2. The digital imaging device of claim 1, wherein the digital imaging device is adapted to initialize to a default mode wherein the IO event manager is pre-initialized to interface the button aware application with the touch-screen.

3. The digital imaging device of claim 2, wherein the digital imaging device is adapted to exit the default mode to interface the touch-screen aware application with the touch-screen when the button aware application is not running.

4. The digital imaging device of claim 1, wherein the digital imaging device is adapted to implement button event input areas on the touch-screen to accept input from a user and provide input to the button aware application.

5. The digital imaging device of claim 4, wherein the digital imaging device graphically renders the button event input areas on the touch-screen in a semi-transparent manner to provide a visual cue to the user.

6. The digital imaging device of claim 1, wherein the touch-screen is configured to use a sub-area to render a graphical user interface for the button aware application and use a remaining area to render a representation of a button interface to accept input from a user.

7. The digital imaging device of claim 6, further comprising:

a display manager implemented by the computer system, the display manager adapted to control the representation of the button interface to interact with the user.

8. A computer readable memory device for a touch-screen equipped digital imaging device, the computer readable memory device for storing computer readable code, which when executed by an embedded computer system built into the digital imaging device causes the digital imaging device to implement:

a hardware abstraction layer coupled to the touch-screen, the hardware abstraction layer for abstracting the functionality of the touch-screen;

a touch-screen manager coupled to the touch-screen via the hardware abstraction layer;

a button interface manager for interfacing with a button aware application, the button interface manager coupled to the touch-screen manager; and an IO event manager coupled to accept input from the touch-screen manager and the button interface manager, wherein if a touch-screen aware application is executed by the computer, the IO event manager interfaces the touch-screen aware application with the touch-screen by communicating with the touch screen manager, and if the button aware application is executed by the computer, the IO event manager interfaces the button aware application with the touchscreen by communicating with the button interface manager, wherein the touch-screen manager emulates button events to the button interface manager such that the button aware application transparently interfaces with the touch-screen to accept input from the user.

9. The computer readable memory device of claim 8, wherein the touch screen manager is configured to communicate directly with the IO event manager to support the button aware application.

10. The computer readable memory device of claim 8, wherein the computer readable code is operable to cause the digital imaging device to initialize to a default mode wherein the IO event manager is pre-initialized to interface the button aware application with the touch-screen.

11. The computer readable memory device of claim 10, wherein the computer readable code is operable to cause the digital imaging device to exit the default mode to interface the touch-screen aware application with the touch-screen when the button aware application is not running.

12. The computer readable memory device of claim 8, wherein the computer readable code is operable to cause the digital imaging device to implement button event input areas on the touch-screen to accept input from a user and provide input to the button aware application.

13. The computer readable memory device of claim 12, wherein the computer readable code is operable to cause the digital imaging device to configure a sub-area of the touch-screen to render a graphical user interface for the button aware application and use a remaining area to render a representation of a button interface to accept input from a user.

14. The computer readable memory device of claim 13, wherein the computer readable code causes the digital imaging device to further implement an interface manager adapted to control the representation of the button interface to interact with the user.

15. The computer readable memory device of claim 8, wherein the computer readable memory device adapted to be removable from the digital imaging device.

16. A method for implementing button interface compatibility for button aware applications executed on the touch screen equipped digital imaging device, the method comprising to the steps of:

a) executing a boot sequence in a touch-screen equipped digital imaging device;

b) pre-initializing an operating environment of the digital imaging device to a default mode to support button aware applications;

c) launching either a button aware application or a touch-screen aware application;

d) when the touch-screen aware application is launched, supporting the touch-screen aware application by interfacing the touch-screen aware application with the touch-screen via an I/O event manager; and e) when the button aware application is launched, supporting the button aware application by:

interfacing the button aware application with the touch-screen by communicating with the I/O event manager using a button interface manager; and emulating button events to the button interface manager using the touch-screen manager such that the button aware application transparently interfaces with the touch-screen to accept inputs from the user.

17. The method of claim 16, wherein step d) further includes the step of:

exiting the default mode to interface the touch-screen aware application with the touch-screen when the button aware application is not running.

18. The method of claim 16, wherein step e) further includes the step of:

implementing button event input areas on the touch-screen to accept input from the user and provide input to the button aware application.

19. The method of claim 18, wherein the digital imaging device graphically renders the button event input areas on the touch-screen in a semi-transparent manner to provide a visual cue to the user.

20. The method of claim 16, wherein step e) further includes the steps of:

configuring a sub-area of the touch-screen to render a graphical user interface for the button aware application; and using a remaining area to render a representation of a button interface to accept input from the user.

21. The method of claim 16, wherein the digital imaging device is a digital camera.

22. The method of claim 16, wherein the digital imaging device is a printer.

23. A digital imaging device having button interface compatibility for button aware applications executing on a touch-screen equipped digital imaging device, comprising;

a touch-screen for accepting input from a user;

an embedded computer system built into the digital imaging device for implementing functionality for the digital imaging device, the computer system having a processor coupled to a memory, the computer capable of executing software applications, wherein the software applications are button aware applications and touch-screen aware applications, the memory storing computer readable code which when executed by the processor causes the computer system to implement a touch-screen manager operable for controlling the touch-screen; and the touch screen manager configured to provide button events or touch screen events to the software applications running on the touch screen equipped digital imaging device, wherein if the touch-screen aware application is executed by the processor, the touch-screen aware application interfaces with the touch-screen through the touch-screen manager, and if the button aware application is executed by the processor, the touch-screen manager emulates button events such that the button aware application transparently interfaces with the touch-screen to accent input from the user.

* * * * *